United States Patent
Snyder, Sr.

(10) Patent No.: US 6,749,032 B2
(45) Date of Patent: Jun. 15, 2004

(54) AUGER CLEANING DEVICE

(75) Inventor: Alan Lynn Snyder, Sr., Krotz Springs, LA (US)

(73) Assignee: Cajun Constructors, Inc., Baton Rouge, LA (US)

( * ) Notice: Subject to any disclaimer, the term of this patent is extended or adjusted under 35 U.S.C. 154(b) by 13 days.

(21) Appl. No.: 10/293,115

(22) Filed: Nov. 12, 2002

(65) Prior Publication Data

US 2004/0089479 A1 May 13, 2004

(51) Int. Cl.[7] ............................................... E21B 12/06
(52) U.S. Cl. .......................................................... 175/84
(58) Field of Search ................................ 198/497, 498, 198/499; 175/84, 313

(56) References Cited

U.S. PATENT DOCUMENTS

| | | | |
|---|---|---|---|
| 1,356,125 A | 10/1920 | Chattstrom | |
| 3,540,572 A | * 11/1970 | McCall | 198/498 |
| 3,968,846 A | 7/1976 | Brenner | 175/84 |
| 4,364,441 A | 12/1982 | Geeting | 175/84 |
| 4,650,012 A | 3/1987 | Bollinger et al. | 175/84 |
| 4,966,498 A | * 10/1990 | Blum | 405/233 |
| 5,242,027 A | 9/1993 | Blum | 175/84 |
| 5,655,610 A | * 8/1997 | Skinner | 175/84 |

* cited by examiner

Primary Examiner—David Bagnell
Assistant Examiner—Kenn Thompson
(74) Attorney, Agent, or Firm—Jones, Walker, Waechter, Poitevent, Carrere & Denegre, L.L.P.

(57) ABSTRACT

The invention is an apparatus for cleaning auger flightings having a mounting attachable to an auger support frame, and an auger cleaning device having a single shaft positioned in the mount; a disk slidable on and rotatable about the shaft; the disk having a series of lobes extending radially from the disk and adapted to be interposed in the flightings of an auger; a stop fixable on the shaft; and a spring to bias the disk against the stop.

10 Claims, 5 Drawing Sheets ical cross-sectioned support frame). Auger 2 is positioned inside the support frame 1 for drilling of a bore hole. Generally, the auger 2 is placed in the frame 1 through the open side. As shown, frame 1 has four elongated upright frame members 10, 11, 12, and 13 (hidden behind auger 2) joined by angularly disposed cross braces 22 and transverse connector members 24. Also as shown, support frame 1 is attached to surface casing 5 that is partially sunk into the ground. The surface casing 5 helps support the auger frame 1 and acts as a guide for the auger 2. The casing can be bolted or welded to the frame. The surface casing's top may have a variety of top plates attached thereto, each top plate having center openings to accommodate a particular auger diameter, thus allowing the operator to change out the surface casing top plate to accommodate different augers. Alternatively, support frame 1 may be suspended in an upright position from the bottom of a crane or other suitable piece of equipment and rest on the ground in vertical orientation, or be constructed like that shown in U.S. Pat. No. 4,966,498.

AUGER CLEANING DEVICE

FIELD OF THE INVENTION

This invention relates to apparatus for cleaning debris such as clay, dirt or stones, from between the flightings of an earth auger as the auger is being removed from a borehole while continuing to rotate in the forward direction.

BACKGROUND OF THE INVENTION

One typical auger for drilling bore holes is illustrated in U.S. Pat. No. 4,966,498 (incorporated by reference). As schematically depicted in that patent, an auger is suspended from an upright, box-like support frame which rests on the ground and extends upwardly from the area in which a bore hole is to be drilled. A crane or other similar unit may be employed to maintain the upright frame in its essentially vertical disposition. Other variants of the auger support frame are utilized, such as a variant where the auger is surrounded (in whole or part) by the auger support frame (see FIG. 1).

As the auger is rotated about its longitudinal axis in a drilling or "forward" direction ("forward" is clockwise rotation on most augers causing the auger to bite into and dig a bore hole in the ground), the auger drills a bore hole and clay or dirt loosened by the auger is brought to the surface of the ground through the auger's flighting and is deposited in the area surrounding the auger. When a borehole of required depth has been formed, the auger is lifted from the hole while rotation thereof is continued in order to continue to lift loosened dirt. Typical auger holes range from 12-inches in diameter up to 48-inches in diameter.

Bore holes formed in the ground for piers are usually deep and are dug with an auger that is made up of a number of connected, end-to-end auger sections. Each auger section has a length designed for ease of transportation on a truck bed and for ease of handling and assembly in the field. Generally, one auger section threads into the adjacent auger section. The end of the shaft of the auger where a connection is formed is generally slightly thickened to accommodate the threaded connection.

Upon extraction of the auger from a borehole, some of the dirt, clay and other accumulation accumulated in the flighting (the "flighting" is considered the volume between adjacent spirals of the auger flight) will be thrown from the auger, and some dirt and clay will remain trapped in the flighting, particularly when working in heavy clays which can substantially fill the spiral space defined by the auger flights. Generally, the flighting can be cleaned by "hand" using boards to knock the material loose from the flightings, or a mechanical device can be used, such as disclosed in U.S. Pat. No. 5,242,027 or U.S. Pat. No. 3,968,846, both of which are incorporated by reference.

Both of these mechanical devices interpose a wheel with daisy-like lobes rotatable on a first shaft. The wheel's lobes are interposed between the flightings for cleaning the flightings by scrapping this area. The device is designed to allow the wheel, upon encountering debris that cannot be removed by scraping, to "kick out" away from between the flightings on an axis different from that of the first shaft. Such movement prevents the device from becoming damaged upon encountering debris that the device is incapable of removing. Both devices, however, are cumbersome, using an articulated arm to position the daisy wheel into engagement and disengagement from the auger's flight paths.

SUMMARY OF THE INVENTION

The apparatus of this invention is a single shaft having a disk with lobes that intermesh with the flightings of an auger, the disk positioned on the shaft to allow rotation of the disk about the shaft, a stop positioned on the shaft on one side of the disk and a spring positioned on the shaft on the other side of the disk to position the disk adjacent to the stop. The shaft is mounted to the support frame of the auger through a mount means.

DETAILED DESCRIPTION OF THE INVENTION

Figure 1:
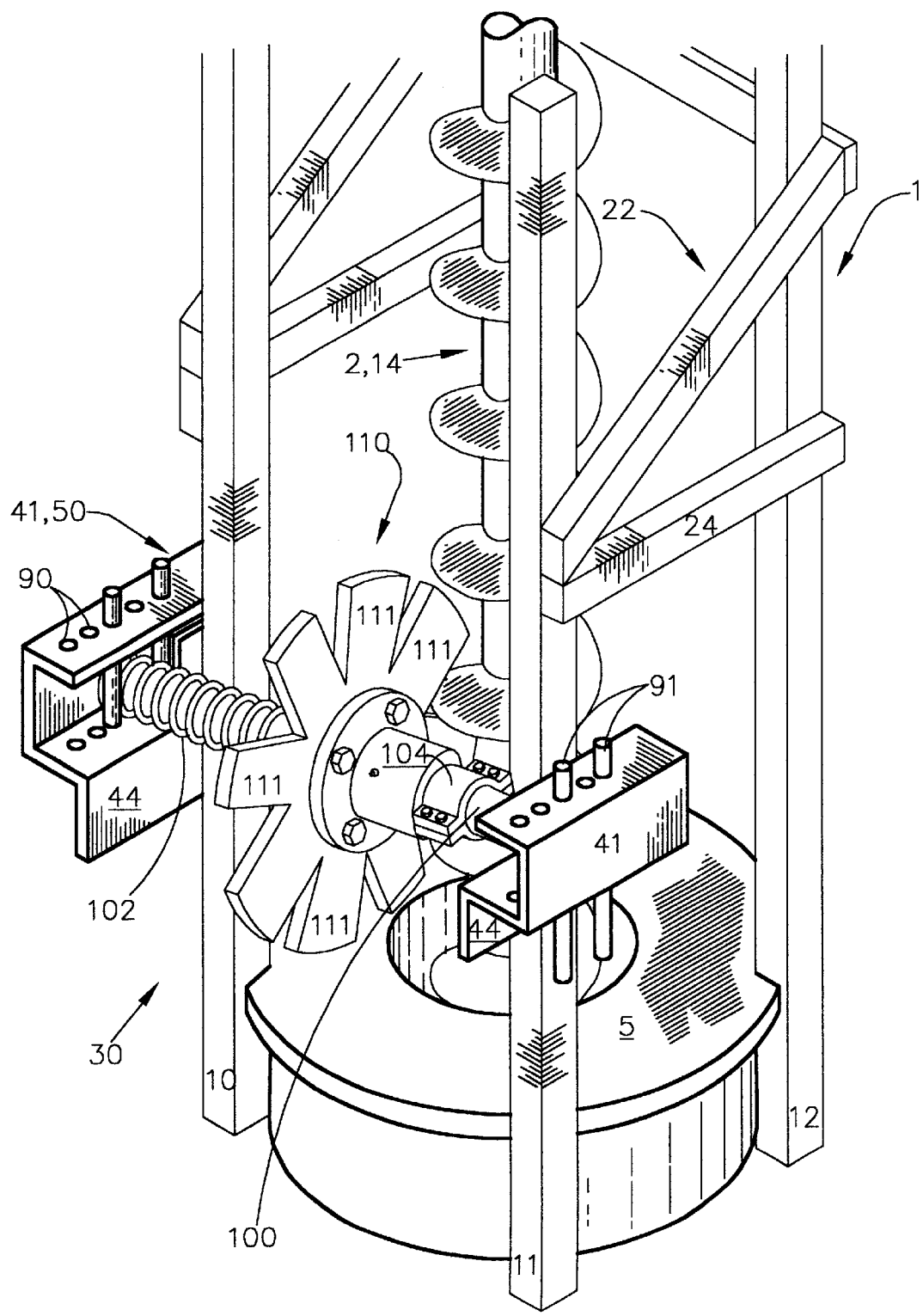
FIG. 1 is a perspective view of auger cleaning apparatus attached to the auger frame.

FIG. 1 shows a typical upright auger support frame 1, which is generally square in cross section, having three closed sides 20 and one open side 21 (other shapes will function as well, for instance a circular cross-sectioned or a triangular cross-sectioned support frame). Auger 2 is positioned inside the support frame 1 for drilling of a bore hole. Generally, the auger 2 is placed in the frame 1 through the open side. As shown, frame 1 has four elongated upright frame members 10, 11, 12, and 13 (hidden behind auger 2) joined by angularly disposed cross braces 22 and transverse connector members 24. Also as shown, support frame 1 is attached to surface casing 5 that is partially sunk into the ground. The surface casing 5 helps support the auger frame 1 and acts as a guide for the auger 2. The casing can be bolted or welded to the frame. The surface casing's top may have a variety of top plates attached thereto, each top plate having center openings to accommodate a particular auger diameter, thus allowing the operator to change out the surface casing top plate to accommodate different augers. Alternatively, support frame 1 may be suspended in an upright position from the bottom of a crane or other suitable piece of equipment and rest on the ground in vertical orientation, or be constructed like that shown in U.S. Pat. No. 4,966,498.

Figure 2:
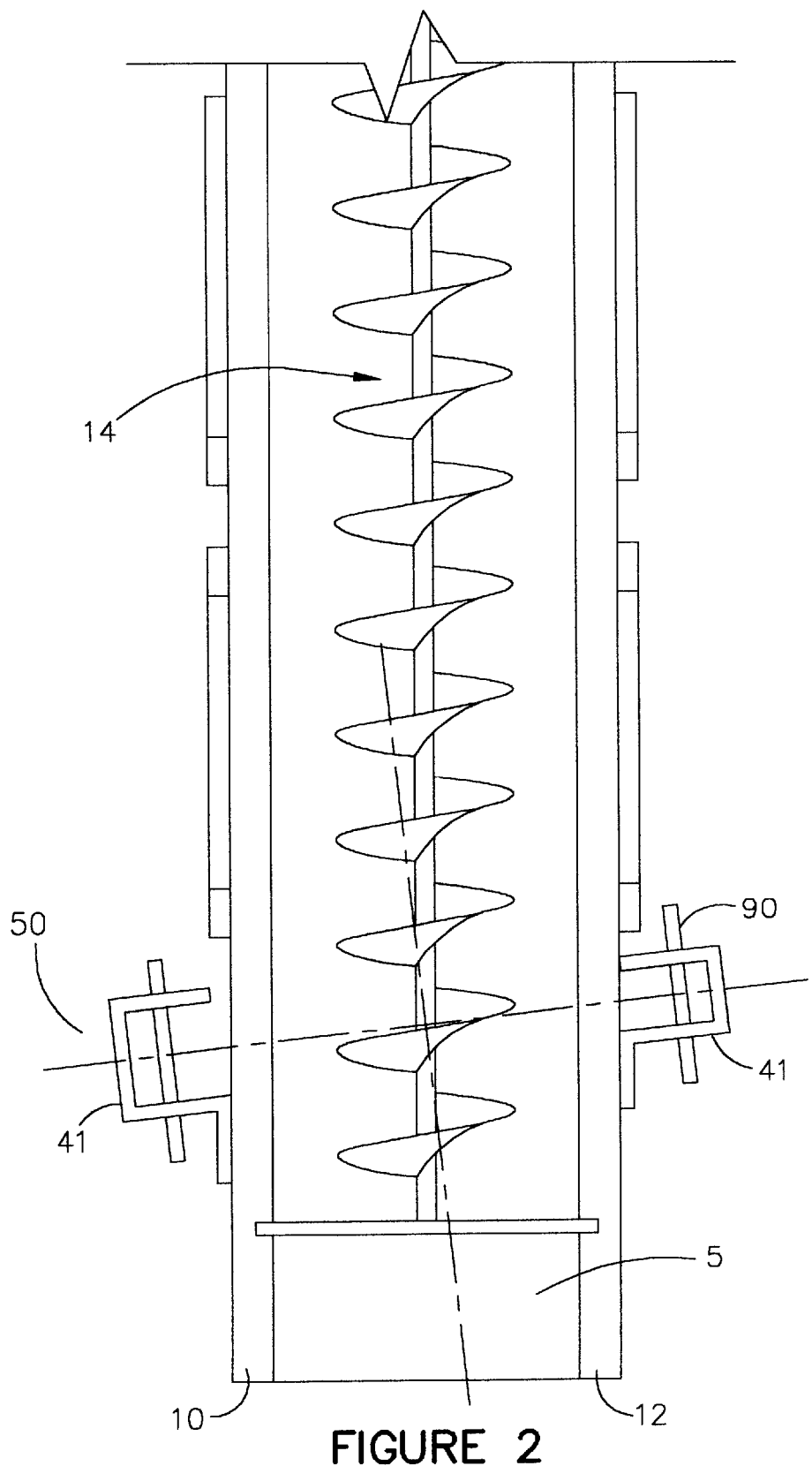
FIG. 2 is a front perspective view of the support frame with mounting means.

Shown in FIG. 2, auger 2 generally is comprised of a number of separate sections, only one section 14 being shown in the drawings. Auger section 14 preferably has a central shaft 21, which can be a hollow pipe that supports a helical flight 22 attached to the outer surface thereof. Alternatively, the auger 2 may simply be a helical flight with no central shaft. In a typical auger section, the pitch of the flight is usually about 15–30 degrees, and the diameter of the auger is nominally in the range if 12–36 inches, but can be larger.

The auger cleaning apparatus 30 of this invention utilizes a mounting means for mounting the cleaning means on the support frame 1. As shown in FIG. 1, one embodiment of the mounting means is two U shaped beams 41, each beam 41 being fixedly attached to one of the upright frame members. As shown, each U shaped beam 41 is welded to a plate 44 which in turn is welded to one of the upright frame members so that the channels in the beams 41 face each other (see FIG. 2). Alternatively, the U shaped beams 41 could be directly attached to the auger support frame 1 by welding or attached by bolts or other attachment devices. As can be seen, the two U shaped beams 41 are mounted on the auger support frame 1 at a angle which is tilted with respect to the auger shaft 21 and the angle of tilt preferably substantially matching the pitch of the flights. The tilted mount is preferred, but not required.

In the embodiment shown in FIG. 2, the earthward most U shaped beam 50 has a larger channel cross-section than the remaining U shaped beam to accommodate the spring, discussed later. The two opposing sides of each U shaped beam 41 have a series of aligned openings 90 therein, through which pins 91 may be inserted. The pins 91 position the auger shaft 21 in the channel to properly locate the cleaning lobes of the disk so to allow the lobes to intermesh with the flighting, as will be later discussed. If the auger cleaning means is not intended to accommodate cleaning heads of different diameters, the multiple aligned opening would not be necessary.

Figure 4A:
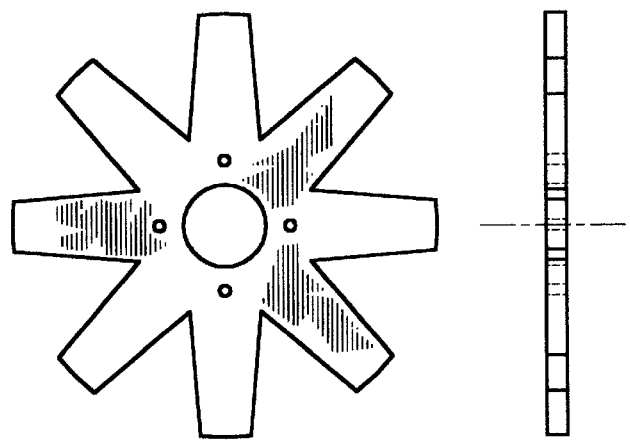
FIG. 4A is a top elevation view and 4B is a side elevation view one embodiment of the cleaning disk.

The auger cleaning means is a single shaft 100, a flighting cleaning head 101 mounted on the shaft 100, a biasing means 102 to position the flighting cleaning head 101 adjacent to a stop device 104. One embodiment of the shaft is a 4-inch diameter solid steel cylinder. As shown, one flighting cleaning head 100 is a wheel or disk 110 having a series of lobes 111 projecting radially designed to intermesh with the flighting, much in the manner of a gear. In general the projecting lobes 111 extending radially from a center hub and can include spokes, rounded lobes, arcuate lobes and other shapes which will operate a cleaning or scraping surface. In FIG. 4A the lobes 111 are shaped as tapering rectangles, and are made of a ¾-inch steel plate.

Figure 5A:
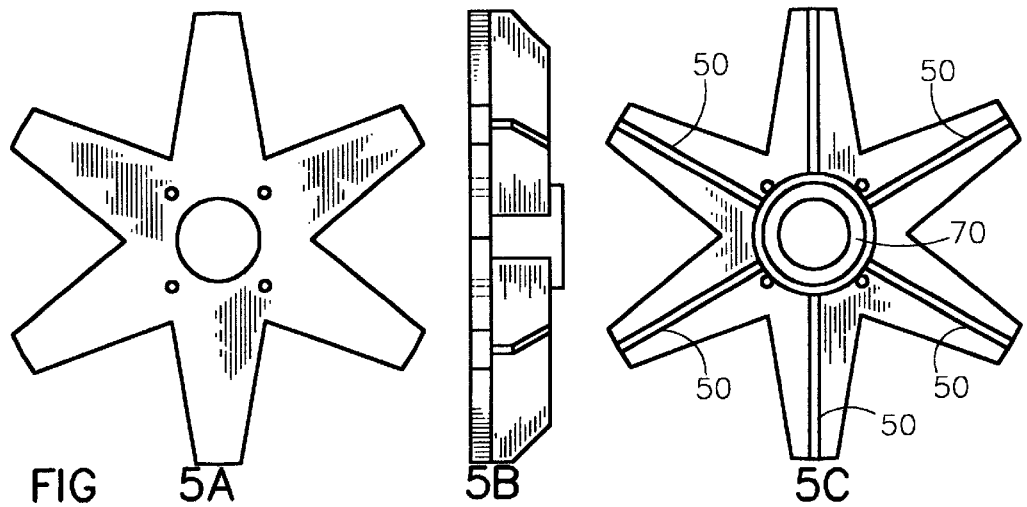
FIG. 5A is a top elevation view, 5B is a side elevation view, and 5C is a bottom elevation view of one embodiment of the cleaning disk.

In operation, the lobes 111 can be subject to large forces. The lobes 111 can have stiffening plates attached to the plates to resist bending motions. Variations of such are shown in FIGS. 3 and 5. As shown in FIG. 5C, one stiffening plate is plate 50 mounted on the "bottom" surface of each lobe 111 at a right angle to the lobe's surface, and extending laterally along the center of the lobe 111. By "bottom" side of the lobe is meant the side of the lobe that the forward turning auger rotates away from, while the forward spinning auger rotates toward or into the "top" side of the lobe. Another alternative stiffening plate is shown in FIG. 3C, comprising two plates 60 and 61 positioned along the outer periphery on the bottom side of the lobe, with a third plate 63 closing the opened end. Note that the stiffening plates 60 and 61 do not extend to the disk's center hub 70. The center hub is a bearing surface for a spring as later described, and the offset provides space to accommodate the spring to allow the spring to bear against the disk's surface and not stiffening plates.

Figure 3A:
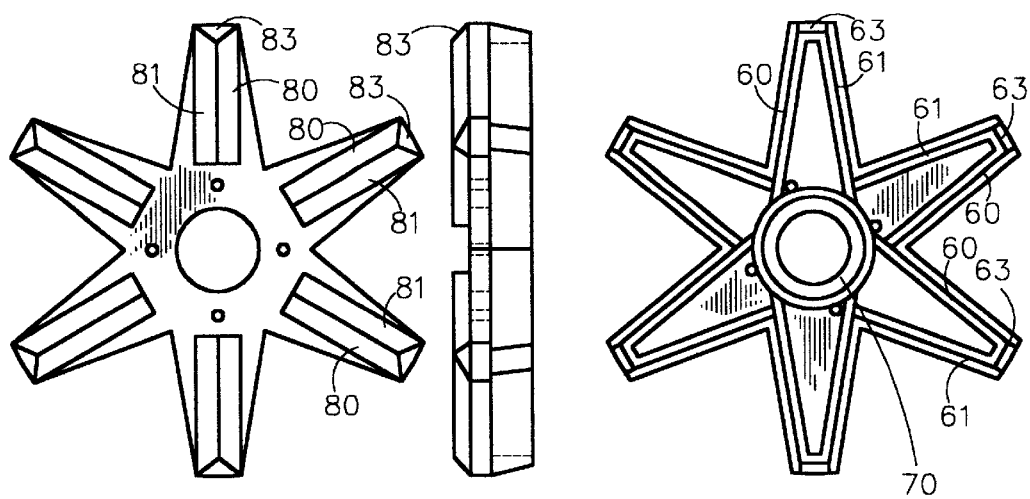
FIG. 3A is a top elevation view, 3B is a side elevation view, and 3C is a bottom elevation view of one embodiment of the cleaning disk.

Stiffening plates may also be placed along the top surface of each lobe 111. Shown in FIG. 3A are two plates 80 and 81 placed on the top surface of the lobe at acute angles to create a brace that is triangular shaped in cross section, with a cap 83 closing the radial end of the triangular brace. The triangular structure is located along the center line of the top side of each lobe 111. The top brace, in addition to providing stiffening of the lobes, helps the lobes 111 intermesh with auger flight.

Each different diameter of the flighting cleaning head 100 wheel or disk 110 will have a number of lobes 111 or blades which diameter of the auger. For instance a 30-inch diameter auger will be associated with a cleaning head of 6 blades or lobes; a 24-inch diameter auger associated with a cleaning head of 7 lobes, and an 18-inch diameter auger will be associated with a cleaning head of 6 lobes. To determine the appropriate number of lobes, the circumference of the wheel is taken at a radius of about R, where R is the (radius of the wheel—radius of auger). This circumference is then divided by the perpendicular length between the augers flightings, and this number is then rounded down to get the maximum number of lobes.

Figure 6:
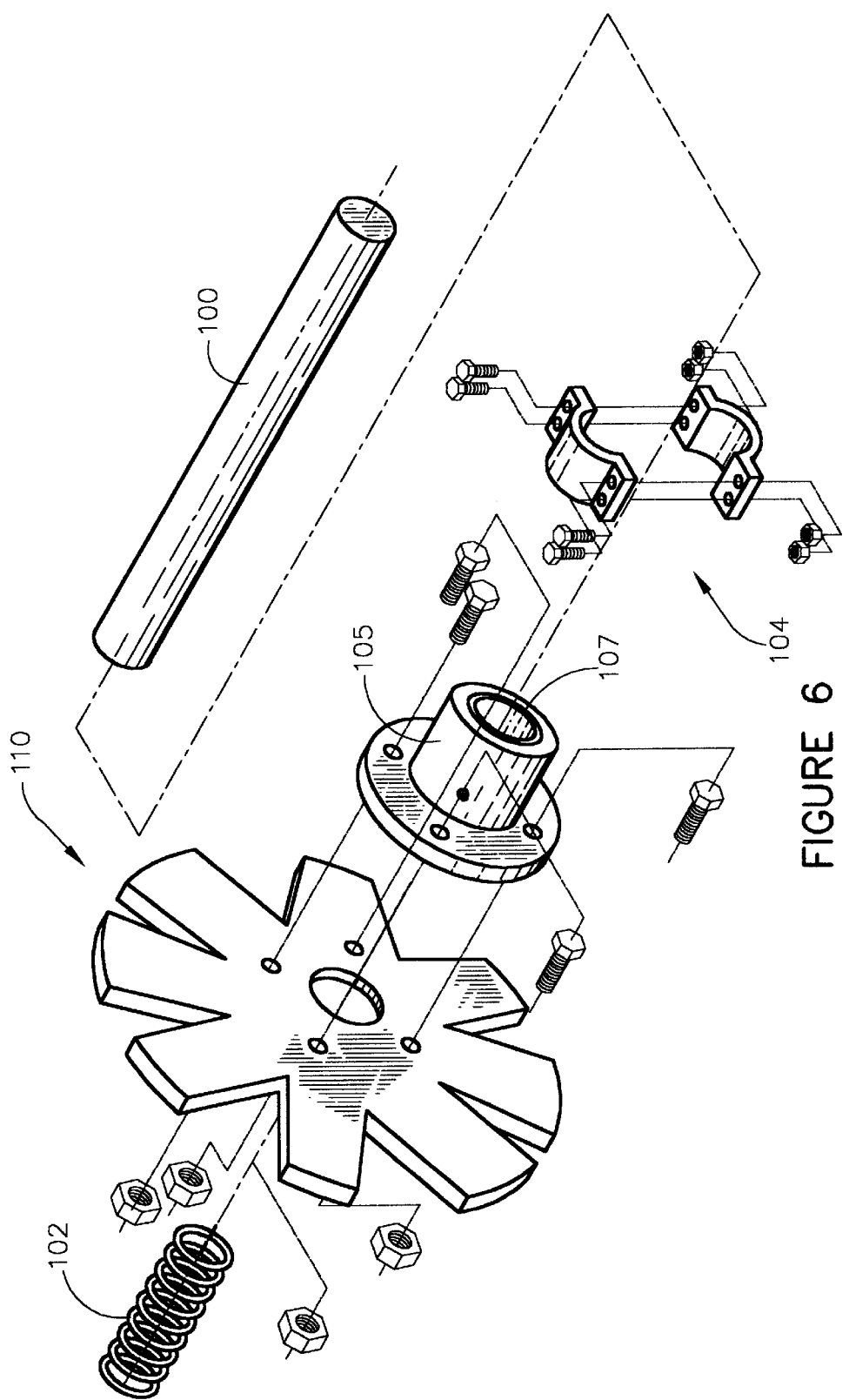
FIG. 6 shows an exploded view of the flighting cleaning means.

As shown in FIG. 6, the disk or wheel 110 is bolted onto a flange on a cylindrical hub 105. The disk could be welded to the hub, but it is preferred to be removably attachable to allow one to interchange disks, particularly disks of different diameters. A bearing or busing 107 is inserted into the bore of the hub. The hub has a grease fitting located on its outer surface to provide lubrication to the bearing or bushing.

The disk surface opposite the hub operates as a thrust surface against which biasing means, shown as a coil spring 102, operates. The second thrust surface for the coil spring 102 is the channel bottom of the U shaped earthward most beam 50. While is it possible to use the U shape beam's side-walls as the thrust surface (thereby allowing both U beams to be the same size), this is not preferred. In one embodiment of the device, the spring was two coil springs taken from the front end of a 1990 Ford Crown Victoria.

The stop 104 is a collar which can be fixed in position along the shaft 100. As shown in FIG. 6, the collar is two semicircular inserts which are bolted together around the shaft 100. The hub 105 is biased against the stop 104 by operation of the spring 102. In other embodiments, the stop can be a fixed collar, or a thickened portion of the shaft.

In operation, the auger cleaning means is assembled as shown in FIG. 6. The proper diameter cleaning head or disk 110 is attached to the hub 105 and the hub 105 positioned on the shaft 100 of the device. The stop 104 is also positioned on the shaft 100 (but not fixed into place) as is the biasing means 102, here a coil spring. The assembled device is then placed in the mounting means by placing the ends of the shaft 100 into the channels of the U shaped beams 41 in the orientation as shown in FIG. 1. The pins 90 are inserted into the mounting means to properly locate the shaft 100 in the channels to position the lobes 111 of the disk 110 for intermeshing with the auger flighting. The smallest diameter cleaning head establishes the minimum distance of the shaft 100 from the frame. This distance can be set either by a pin 90, or by a fixed wall 93 across the U shaped channel (see FIG. 1). Obviously, the shaft would be located further from the frame when a 48 inch disk is attached as opposed to a 30 inch wheel.

It is desired that the radial peripheral edge of the lobes 111 be positioned about ½ to 1-inch away from the outer edge of the auger shaft. The ½ to 1-inch gap prevents the radial edge of the lobes 111 from catching or binding on the auger shaft, including the thickened auger shaft joint in the area of an auger joint of two auger sections.

The stop 104 is fixed in position along the shaft 100 to properly position the lobes 111 with respect to the auger. It is preferred that the center of the disk 110 (which is tilted with respect to the auger shaft 100) be aligned with the center of the auger shaft, as is shown by the axis in FIG. 2. Obviously, the maximum transverse dimension of each lobe 111 is less than the distance between adjacent flight sections of the auger.

When auger 12 is rotated forward to drive the auger 12 into the ground, the cleaning device merely freewheels as portions of the auger flight 28 engage the lobes 111 of the disk 110 rotating the disk. In operation, the disk and cleaning device can jointly rotate or the disk alone can rotate, it is not required that the cleaning device shaft remain stationary. It may be desirable to install cup bushings at one or both ends of the shaft to assist the shaft when rotating within the "U" channels. While the auger is rotating forward and actually drilling, the lobes 111 are successively brought into the space between adjacent auger flights.

Upon completion of a bore hole, the auger 12 is lifted upwardly by a crane or other lifting means; however, the auger 12 continues to rotate in the forward direction. During this procedure, clay, dirt and/or other debris trapped between adjacent auger flights should be removed. As the auger 12 is pulled out of the bore hole, the auger cleaning device's lobe 111, which is interposed in the flighting, acts as a scraper cleaning this area. As the auger is raised and turned, successive lobes 111 of the device will rotate into cleaning position (in the flighting), with only one lobe in position to clean at any given time.

The spring 102 and stop 104 operate to keep the disk 110 positioned in the proper orientation with respect to the auger shaft thereby keeping the lobes 111 positioned to intermesh with the flightings. As the auger 12 is extracted, some portions of the flighting may have debris wedged therein which cannot be removed by action of the cleaning device. In this instance, the lobes 111 of the device must be moved from the path of the rotating wedged debris to avoid damaging the device. This is accomplished through the spring's action. The forward rotation of the auger 12 will force the debris against the top surface of the lobe 111 positioned in the flighting. The debris will either be scrapped free by this action, or will exert a force against the top lobe surface sufficient to overcome the spring's biasing force, resulting in compression of the spring. As the spring compresses, the disk is moved down the shaft away from the auger. Downward movement will continue until the wedged material in the flighting clears the contact lobe 111 through the rotation of the auger 12. When this occurs, the spring 102 restoring force will be sufficient to bias the disk 110 upwardly until the disk 110 encounters the stop 104, at which point normal cleaning action of the device continues. Hydraulic arms could be used as a biasing means, but it is not preferred.

Figure 7:
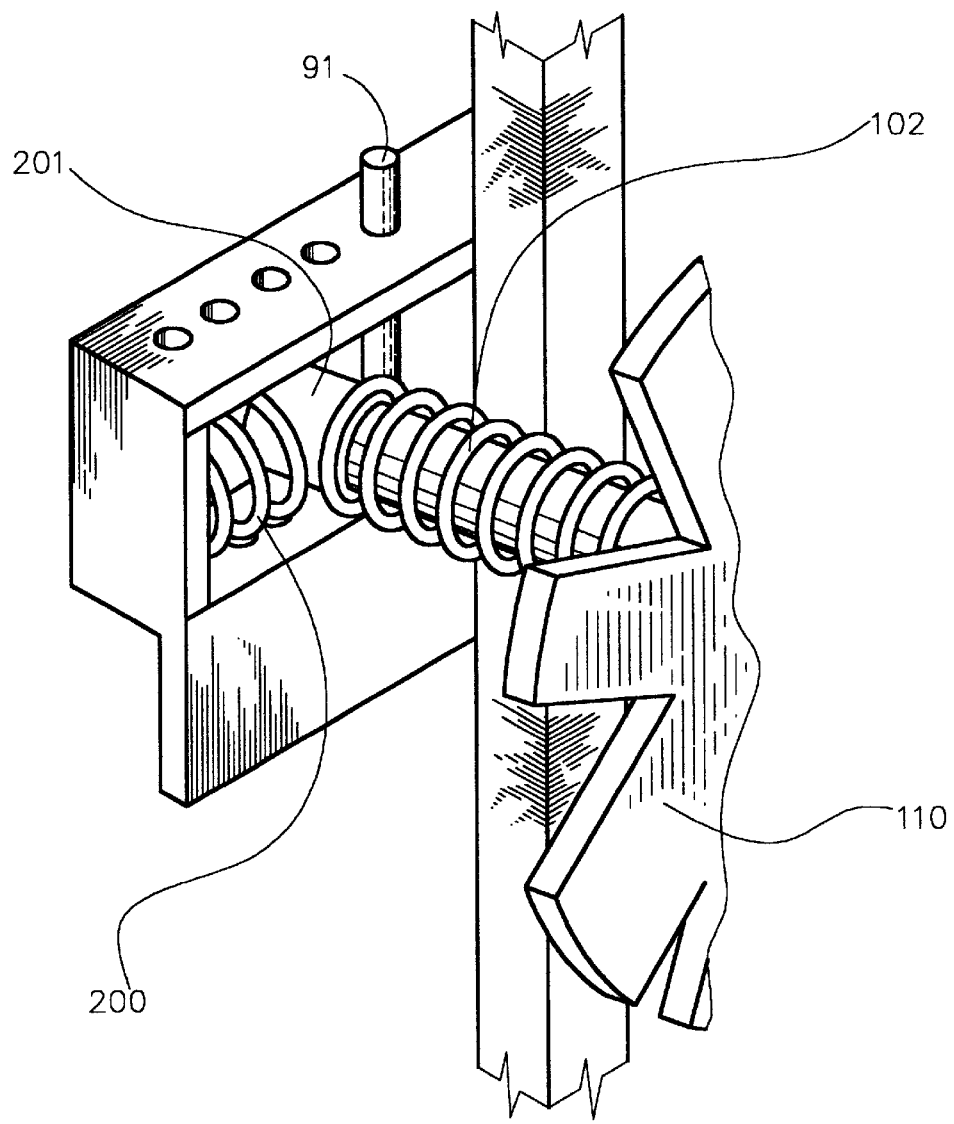
FIG. 7 is a perspective view of the U channel incorporating the transverse spring.

If desired, a second stop can be incorporated on the shaft and placed below the biasing means, thereby allowing adjustment of the restoring force of the springs by pretensioning the springs. Alternative designs include the elimination of the stop, and in its place, installation of a second spring or biasing means. The second spring would allow the cleaning device to be used when the auger is rotating in reverse or non-drilling direction. Another alternate design includes partially closing the open side of the earthward "U" shaped beam and inserting a second spring 200 in this partially closed channel (see FIG. 7). This second transverse spring 200 would act on the shaft at right angles to spring 102. This arrangement allows the shaft to move perpendicular to the frame in conjunction with the disk 110 moving along the shaft 100 when a lobe 111 encounter an object stuck in the flightings. Thus, an additional safety factor is incorporated. Upon clearing the stuck object, transverse spring 200 restores the shaft 100 position adjacent interior pin 91, while spring 102 restores disk 110 against stop 104. To assist the action of the transverse spring 200, a cup bushing 201 can be positioned on end of shaft 100 adjacent transverse spring 200 to provide a smooth surface for the transverse spring 200 to bear against.

I claim:

1. A apparatus for cleaning auger flightings comprising a mounting means attachable to an auger support frame for mounting an auger cleaning device, and an auger cleaning means comprising a single shaft positionable on said mounting means, a disk slidable on and rotatable about said shaft, said disk having a series of lobes extending radially from said disk and adapted to be interposed in the flightings of an auger, a stop fixable on said shaft, and a biasing means positioned on said shaft to bias said disk against said stop.

2. An apparatus for cleaning auger flightings according to claim 1 wherein said disk is removably attachable to a hub, said hub being slidable on said shaft.

3. An apparatus for cleaning auger flightings according to claim 1 wherein said stop is adapted to be is removably fixed to said shaft.

4. An apparatus for cleaning auger flightings according to claim 1 wherein said biasing means is a spring.

5. An apparatus for cleaning auger flightings according to claim 1 wherein said lobes have a top and a bottom surface, and wherein each of said lobes has at least one stiffening plate positioned on said bottom surface of said lobe.

6. An apparatus for cleaning auger flightings according to claim 1 wherein said lobes have a top and a bottom surface, and wherein each of said lobes has at least one stiffening plate positioned on said top surface of said lobe.

7. An apparatus for cleaning auger flightings according to claim 1 wherein said mounting means includes two U shaped beams.

8. In combination with an auger support frame, said auger support frame comprises a series of upright frame members, an apparatus for cleaning auger flightings, said apparatus comprising a mounting means attached to said auger support frame for mounting an auger cleaning device, and an auger cleaning means comprising a single shaft positionable on said mounting means, a disk slidable on and rotatable about said shaft, said disk having a series of lobes extending radially from said disk and adapted to be interposed in the flightings of an auger, a stop fixable on said shaft, and a biasing means positioned on said shaft to bias said disk against said stop.

9. The combination of claim 8 wherein said mounting means comprises two U shaped beams each forming a channel, each beam mounted on one of said series of upright members so that said channels are in a facing relationship.

10. The combination of claim 9 wherein said facing U shaped beams channels define an axis, and said axis forms an angle of 15–30 degrees with respect to said upright frame members of said auger support frame.

* * * * *